(12) United States Patent
Hogeboom et al.

(10) Patent No.: US 8,799,381 B2
(45) Date of Patent: *Aug. 5, 2014

(54) METHOD AND APPARATUS FOR ENABLING AUTHENTICATION OF ON-LINE COMMUNICATIONS

(75) Inventors: David A. Hogeboom, Huntersville, NC (US); William Koenig, Lafayette, CA (US); David Wright, Livermore, CA (US); Richard Wade Phillips, Harrisburg, NC (US); Rhonda MacLean, Sherrills Ford, NC (US); William A. Parra, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 436 days.

This patent is subject to a terminal disclaimer.

(21) Appl. No.: 13/175,747

(22) Filed: Jul. 1, 2011

(65) Prior Publication Data

US 2011/0265170 A1 Oct. 27, 2011

Related U.S. Application Data

(63) Continuation of application No. 10/905,942, filed on Jan. 27, 2005, now Pat. No. 7,996,530, which is a continuation-in-part of application No. 10/904,532, filed on Nov. 15, 2004, now Pat. No. 7,584,255.

(51) Int. Cl.
*G06F 15/16* (2006.01)
*H04L 12/58* (2006.01)
*H04L 29/06* (2006.01)

(52) U.S. Cl.
CPC ............ *H04L 51/08* (2013.01); *H04L 63/1475* (2013.01); *H04L 63/123* (2013.01); *H04L 63/1483* (2013.01)

USPC ............................ 709/206; 709/205; 709/203

(58) Field of Classification Search
USPC .................................................. 709/205–206
See application file for complete search history.

(56) References Cited

U.S. PATENT DOCUMENTS

| | | | |
|---|---|---|---|
| 4,879,747 A | 11/1989 | Leighton et al. | |
| 5,412,717 A * | 5/1995 | Fischer | 713/156 |
| 5,841,978 A | 11/1998 | Rhoads | |
| 6,131,162 A | 10/2000 | Yoshiura et al. | |
| 6,175,831 B1 | 1/2001 | Weinreich et al. | |
| 6,584,505 B1 | 6/2003 | Howard et al. | |
| 6,640,301 B1 | 10/2003 | Ng | |
| 6,647,257 B2 | 11/2003 | Owensby | |
| 6,707,472 B1 | 3/2004 | Grauman | |

(Continued)

*Primary Examiner* — Minh-Chau Nguyen
(74) *Attorney, Agent, or Firm* — Michael A. Springs; Moore & Van Allen PLLC; Nicholas C. Russell

(57) ABSTRACT

Method and apparatus for enabling authentication of on-line communications. In some embodiments, a message code is embedded in an e-mail, where the message code can be used by the recipient to verify the authenticity of the e-mail or of a Web site. In some embodiments, this code can be created for a particular e-mail message; in other embodiments, the code is created as a watermark for use by a customer or other a specific user or recipient. The message code is associated with both the e-mail message and the recipient. In the case of a message-specific code, a recipient can verify the e-mail message by inputting the code via a Web server to be looked up in the database. Provision is also made for including stenographic information in graphical or other codes as further authentication when accessing a Web site.

32 Claims, 12 Drawing Sheets

(56) References Cited

U.S. PATENT DOCUMENTS

| | | |
|---|---|---|
| 6,959,382 B1 | 10/2005 | Kinnis et al. |
| 7,039,805 B1 | 5/2006 | Messing |
| 7,076,533 B1 | 7/2006 | Knox et al. |
| 7,082,538 B2 | 7/2006 | Bouchard et al. |
| 7,100,049 B2 | 8/2006 | Gasparini et al. |
| 7,146,404 B2 | 12/2006 | Kay et al. |
| 7,263,205 B2 | 8/2007 | Lev |
| 7,278,024 B2 | 10/2007 | Sundararajan et al. |
| 7,346,660 B2 | 3/2008 | Kulkarni |
| 7,562,222 B2 | 7/2009 | Gasparini et al. |
| 7,730,321 B2 | 6/2010 | Gasparini et al. |
| 7,966,492 B1 | 6/2011 | Gasparini et al. |
| 2002/0007453 A1 | 1/2002 | Nemovicher |
| 2002/0032863 A1 | 3/2002 | Ha |
| 2002/0049679 A1 | 4/2002 | Russell et al. |
| 2002/0169854 A1 | 11/2002 | Tarnoff |
| 2003/0101116 A1* | 5/2003 | Rosko et al. ............ 705/35 |
| 2003/0154406 A1 | 8/2003 | Honarvar et al. |
| 2004/0006598 A1 | 1/2004 | Bargagli Damm et al. |
| 2004/0015699 A1 | 1/2004 | Thomas et al. |
| 2004/0054887 A1 | 3/2004 | Paulsen, Jr. et al. |
| 2004/0103306 A1 | 5/2004 | Paddock et al. |
| 2004/0139152 A1 | 7/2004 | Kaler et al. |
| 2004/0215472 A1* | 10/2004 | Gleckman ............... 705/1 |
| 2005/0055451 A1 | 3/2005 | Tsuyama et al. |
| 2005/0108336 A1 | 5/2005 | Naick et al. |
| 2005/0165698 A1 | 7/2005 | Cho et al. |
| 2005/0188020 A1 | 8/2005 | Avritch et al. |
| 2005/0188077 A1 | 8/2005 | Quintanilla et al. |
| 2005/0268101 A1 | 12/2005 | Gasparini et al. |
| 2005/0268107 A1 | 12/2005 | Harris et al. |
| 2006/0005024 A1* | 1/2006 | Law ...................... 713/168 |
| 2006/0101334 A1 | 5/2006 | Liao et al. |
| 2007/0271463 A1 | 11/2007 | Ginter et al. |
| 2008/0013832 A1 | 1/2008 | Lev |
| 2008/0028475 A1 | 1/2008 | Kalman |
| 2008/0250481 A1 | 10/2008 | Beck et al. |
| 2011/0072493 A1 | 3/2011 | Morishita et al. |

\* cited by examiner

FIG. 9

XYZ Bank

Email Validator

Tell us more about the message you received.

It's important that we follow-up with you if the Message Code you entered was not valid or the details of the Email you received don't match those of a valid Message Code in our records.

Please provide us more details through the secure form below.

Title:

*First Name:

Middle Initial:

*Last Name:

*Email Address:
(A valid Email address is required to respond to you.)
Please confirm that the Email address you typed is correct.

Street Address:

Home
Help
Contact
Search

METHOD AND APPARATUS FOR ENABLING AUTHENTICATION OF ON-LINE COMMUNICATIONS

CROSS-REFERENCE TO RELATED APPLICATIONS

This application is a continuation of U.S. patent application Ser. No. 10/905,942, filed on Jan. 27, 2005, and entitled "Method and Apparatus for Enabling Authentication of On-Line Communications," which in turn is a continuation-in-part of U.S. patent application Ser. No. 10/904,532, now U.S. Pat. No. 7,584,255, filed on Nov. 15, 2004, and entitled "Method and Apparatus for Enabling Authentication of E-mail Messages." The entire contents of the '942 application and the '255 patent are incorporated herein by reference.

BACKGROUND OF INVENTION

Identity theft victimizes millions of people each year and costs businesses billions of dollars. Internet-based identity theft is a type of Internet fraud that is increasingly viewed as a significant threat to consumers and businesses. Two interrelated methods of carrying out this Internet fraud are called "phishing" and "spoofing."

Phishing is a term coined by hackers who generate e-mails that imitate legitimate e-mails from businesses or other organizations to entice people to share personal information, such as passwords, credit-card numbers, account information, etc. Phishing involves the distribution of fraudulent e-mail messages with return addresses, links, and branding that appear to come from banks, insurance agencies, or other legitimate businesses. Victims typically receive an e-mail telling them they must supply some personal information to the sender via return e-mail or using a Web link.

Spoofing, as the term is applied to the Web, refers generally to the practice of setting-up an illegitimate Web site that is designed to appear like a legitimate and reputable Web site. Such illegitimate Web sites typically present on-line forms for entering personal information, which is then stored and used by the operator of the illegitimate Web site for nefarious purposes. The information gathering success of spoofing alone depends on Web surfers randomly, often accidentally, browsing to the spoofing site, thus, effectiveness for the hacker is limited. However, when spoofing is combined with phishing, so that e-mails from the illegitimate Web site operator contain links to the illegitimate Web site, the spoofing gathers much more information for the hacker, since there is a mechanism to direct consumers to the illegitimate Web site in greater numbers. Thus, an e-mail system that guards against phishing can effectively reduce Internet fraud perpetrated by both phishing and spoofing. Spoofing can also be reduced if a Web site uses mechanisms to reliably identify itself to consumers.

SUMMARY OF INVENTION

The present invention as implemented in the example embodiments disclosed, provides e-mail phishing countermeasures by embedding a message code in an e-mail, where the message code can be used to verify the authenticity of the e-mail. In some embodiments, this code can be created for a particular e-mail message, and thus may be referred to herein a message-specific code. In such a case, different e-mail messages to the same consumer might each have a unique code. In other embodiments, the message code is created for a specific customer, consumer, or e-mail recipient, and can be re-used for multiple e-mail messages, and in some embodiments for Web site access. Such a code can be referred to herein as a recipient-specific code, user-specific code or a "watermark." These two types of message codes are not mutually exclusive, that is both types of message codes can be used within the same on-line system.

In some embodiments, an e-mail message from a business or other sender to a recipient is processed by first creating an e-mail message that has a message code logically connected to it by the sender's e-mail system, for example, via a database. The message code can be associated with both the e-mail message and the recipient by being stored in association with the recipient's e-mail address, although it may be unique only to one or the other. For example, the message code may be generated for and uniquely associated with the specific message, or it may be a pre-existing code that is uniquely associated with the specific recipient. Regardless of the type of message code used, the e-mail message can be sent to the recipient with the message code embedded therein to serve as an indicator of the authenticity of the e-mail message. Note that even if an e-mail with the same text message is sent to multiple recipients, each recipient can independently authenticate the e-mail using the embedded code, whether the same message-specific code is used for all recipients, a separate message-specific code for each copy of the e-mail is used, or the appropriate recipient-specific code is used for each copy of the e-mail.

In some embodiments, the message-specific e-mail code is generated for the e-mail message, for example by means of a code generator on an application server. The code is then stored in a database with the e-mail address and possibly other message details prior to being sent. After the e-mail message is sent, the e-mail message is authenticated by the recipient inputting the code to be looked up in the database, for example, via a second server, which may be a Web server which provides an on-line form.

In other embodiments, the message code may be established in advance as a recipient-specific code or watermark to be used to authenticate all messages sent to a specific recipient. In such a case, authentication via a server would not be required for each e-mail, since presumably the recipient knows their message code, but a mechanism for authenticating such messages could optionally be provided. In such an embodiment, the recipient or customer can be permitted to select their own code, which could be an alphanumeric string, an image, or a combination of the two. This selection can be made via a Web page.

In some embodiments, a message code can be created that is can be used by a specific user to authenticate Web site access instead of or in addition to authenticating Email messages. Such a message code can be a graphical message code, and further security can be provided by embedding stenographic information in the message code. When a user desires to access a Web site that is secured using a message code, the Web server can, upon receiving a userid for the specific user, present the message code to the user and receive authentication based on the user verifying the message code and possibly any stenographic information.

As previously mentioned, both types of message codes can be implemented in the same system, for example, message-specific codes can be used for marketing messages to consumers at large, and recipient-specific codes or watermarks can be used for existing customers, where the watermark is created and/or assigned when the customer sets up an account. Any of the above embodiments can be implemented by means of computer program products including computer program code instructions which process the e-mails. The instructions can, for example, direct the operation of various processing means, such as a first server which creates e-mail messages and injects message codes, a database for storing codes and e-mail addresses, and a second server, which provide a Web interface. The system can additionally provide for further authentication of e-mail messages by verifying message details, and can also provide a notification mechanism for alerting appropriate parties to apparent phishing attempts.

BRIEF DESCRIPTION OF DRAWINGS

FIG. 9 is a screen shot showing how a detail form designed to provide notification of a phishing attempt might appear to a recipient according to at least some embodiments of the present invention.

DETAILED DESCRIPTION

Figure 1:
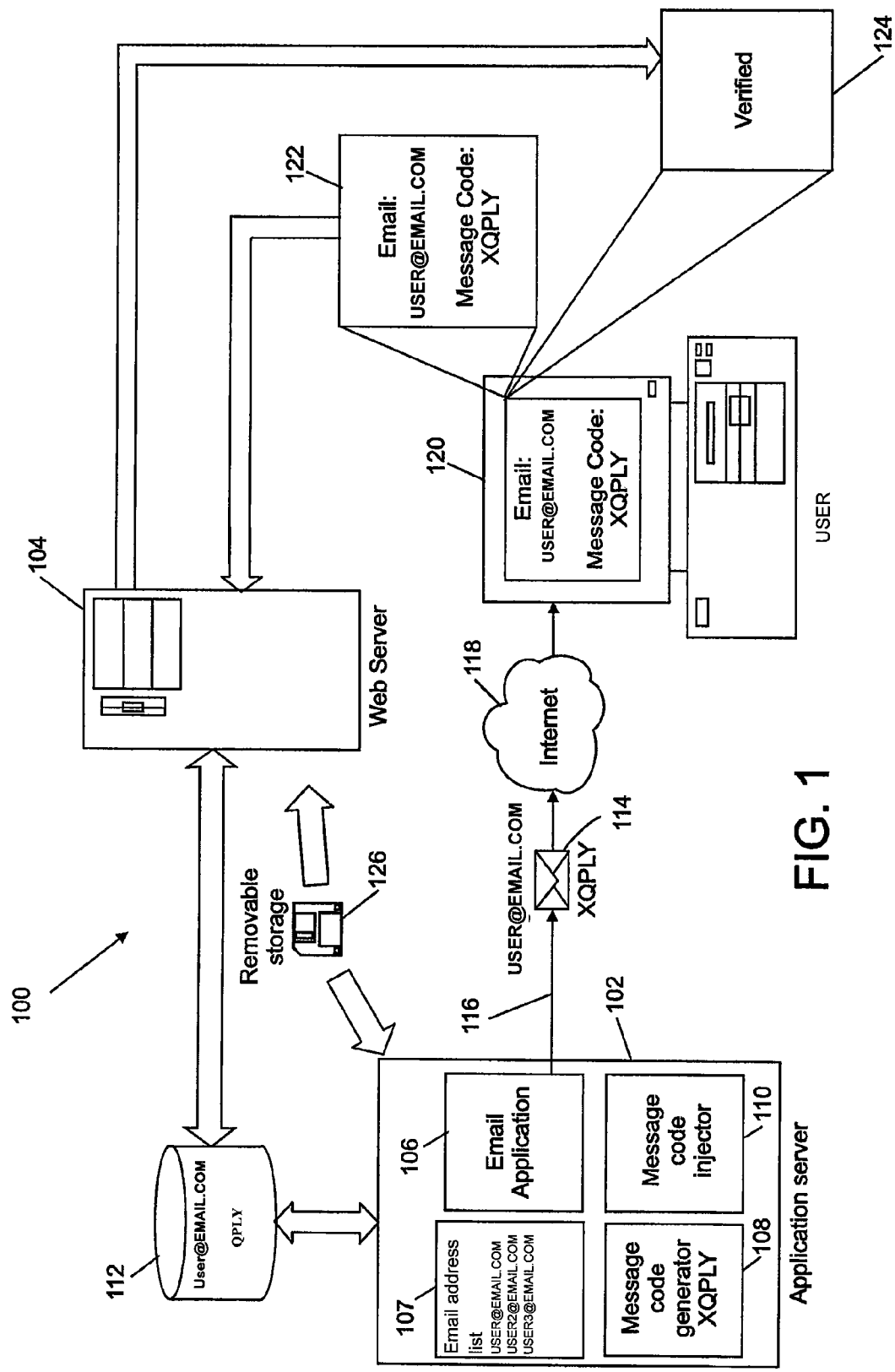
FIG. 1 is a block diagram which illustrates the system and operating environment according to one embodiment of the invention.

The present invention will now be described in terms of specific, example embodiments. In should be understood that the invention is not limited to the example embodiments disclosed. It should also be understood that not every feature of the methods and systems described is necessary to implement the invention as claimed in any particular one of the appended claims. Various elements and features of various embodiments are described to fully enable the invention.

Throughout this disclosure, where a process or method is shown or described, the steps, lower level processes, or sub-processes of the method or methods may be performed in any order or simultaneously, unless the contrary is clear from the context, or is expressly stated. Also, time lapses can occur between steps, and can vary in length. It should also be understood that with respect to flowcharts, block diagrams, and signal flows, not every possible flow, path, or structure is shown. Rather, for clarity, only those important to the inventive concepts being discussed may be illustrated, even though others may be discussed in this description.

It may be helpful for the reader to understand the meaning of a few terms and phrases as used throughout this disclosure, from the beginning. The meaning of other terms and phrases are as would be understood by those of ordinary skill in the art, or will be made clear as they are used. Reference may be made herein to e-mails assembled or generated by a "sender" or the like. This term is simply meant to imply that the sender of an e-mail directs the creation and embedding of message codes in e-mail messages. The term is not meant to imply that a corporation or other entity cannot contract out or otherwise assign the task of managing its e-mails to another party. In such a situation, the party desirous of initiating the communication still exerts some control over how and when e-mails are sent, thus, message codes generated in such a context can still be considered to have been associated or embedded in an e-mail created by a "sender."

At various places in this disclosure, reference may be made to a message code being "logically connected" with an e-mail message, as well as being "associated" with an e-mail message and/or a recipient. Further, mention may be made of a message code being "uniquely associated" with an e-mail message or a recipient. A message code is logically connected with an e-mail message if it is established in anticipation of being used to authenticate the e-mail message. A message code is associated with an e-mail message and/or a recipient if it is stored in a data processing or other system in such a way as to facilitate the matching of the message code with a specific message to a specific recipient. In such a case, the message code may not be uniquely associated with both, but will often be uniquely associated with one or the other. When a message code is "uniquely associated" with a recipient, what is meant is that the message code is selected for use with e-mails to that recipient, and, at least to the extent necessary to facilitate acceptably secure operation of the e-mail system, is only associated with that recipient. Such a message code can be used in multiple e-mail messages, and thus is not unique to a specific e-mail message. When reference is made to a message code being uniquely associated with a message, what is meant is that the message code is unique to a specifically identifiable e-mail message, at least to the extent necessary to facilitate the acceptably secure operation of an e-mail system like that described as intended. Such a "uniquely associated" message code may be displayed to a customer during Web site communications. Similarly, the term "Web site" as mentioned in this disclosure is not meant to imply that a corporation or other entity cannot contract out or otherwise assign the task of managing its Web site to another party. In such a situation, the party desirous of providing the Web site still exerts some control over how the Web site presents message codes, watermarks, and the like. The use of message codes as described herein in such a situation can constitute an embodiment of this invention.

Reference is made in this disclosure to "stenographic information" and the like. These references refer to the process of embedding identifying information in an image or other multimedia digital file. For example, the process of embedding stenographic information in digital photographs to identify the origin of a photo is known. In example embodiments of the invention described herein, stenographic information can simply be identifying information, or can use signature keys or cryptographic techniques to provide authentication.

FIG. 1 is a network block diagram illustrating the operation of the invention in an example embodiment wherein a message-specific code, which is uniquely associated with each e-mail message, is used to provide for verification and authentication of e-mail messages. System 100 of FIG. 1 includes application server 102 and web server 104. When a sender desires to create an e-mail message with a message-specific code embedded therein, e-mail application 106 is invoked and creates an e-mail message to one or more of a list of addressees. In this example, e-mail address list 107 is also maintained on the application server. An e-mail address list can also be maintained in a separate database system, or another application. It would also be possible to maintain the e-mail address list in a database system which also contains the message code database. A system can also be provided for an e-mail address to be manually entered when generating an e-mail message.

Returning to FIG. 1, message code generator 108 generates a message code for each recipient. Application server 102 maintains each generated message code as logically connected with each e-mail message. Message code injector 110 embeds the message code in the e-mail message. In the example of FIG. 1, an e-mail message is being composed to User@EMAIL.COM, and the message-specific code to be embedded is the code "XQPLY." Application server 102 stores User's e-mail address and the unique message code for her e-mail message in database 112. This message specific code is now associated with both the e-mail message and the recipient, User@EMAIL.COM. The message code is also unique to the specific e-mail message being sent, thus it is a message-specific code. E-mail message 114 is dispatched over a network connection, 116, in the manner of the prior art. E-mail message 114 traverses the Internet, 118.

E-mail message 114 is eventually displayed to User on her personal computer or workstation, 120. In example embodiments, the e-mail message includes instructions on how to authenticate the e-mail message by verifying the message code and possibly other information using, in this example, the World-Wide Web. User can authenticate the e-mail message by providing input, in this case, her e-mail address and the message code, via a Web page, which is displayed on her workstation as shown schematically by user screen 122. Web server 104 then accesses database 112 and verifies that a message with the message-specific code "XQPLY" was in fact sent to User@EMAIL.COM. Web server 104 then provides a screen which verifies the message code, as shown schematically at 124. It is possible to also use additional message details to further verify the e-mail message sent to User. Further discussion of these possibilities is presented with reference to the screen shots which are discussed later in this disclosure.

Figure 2:
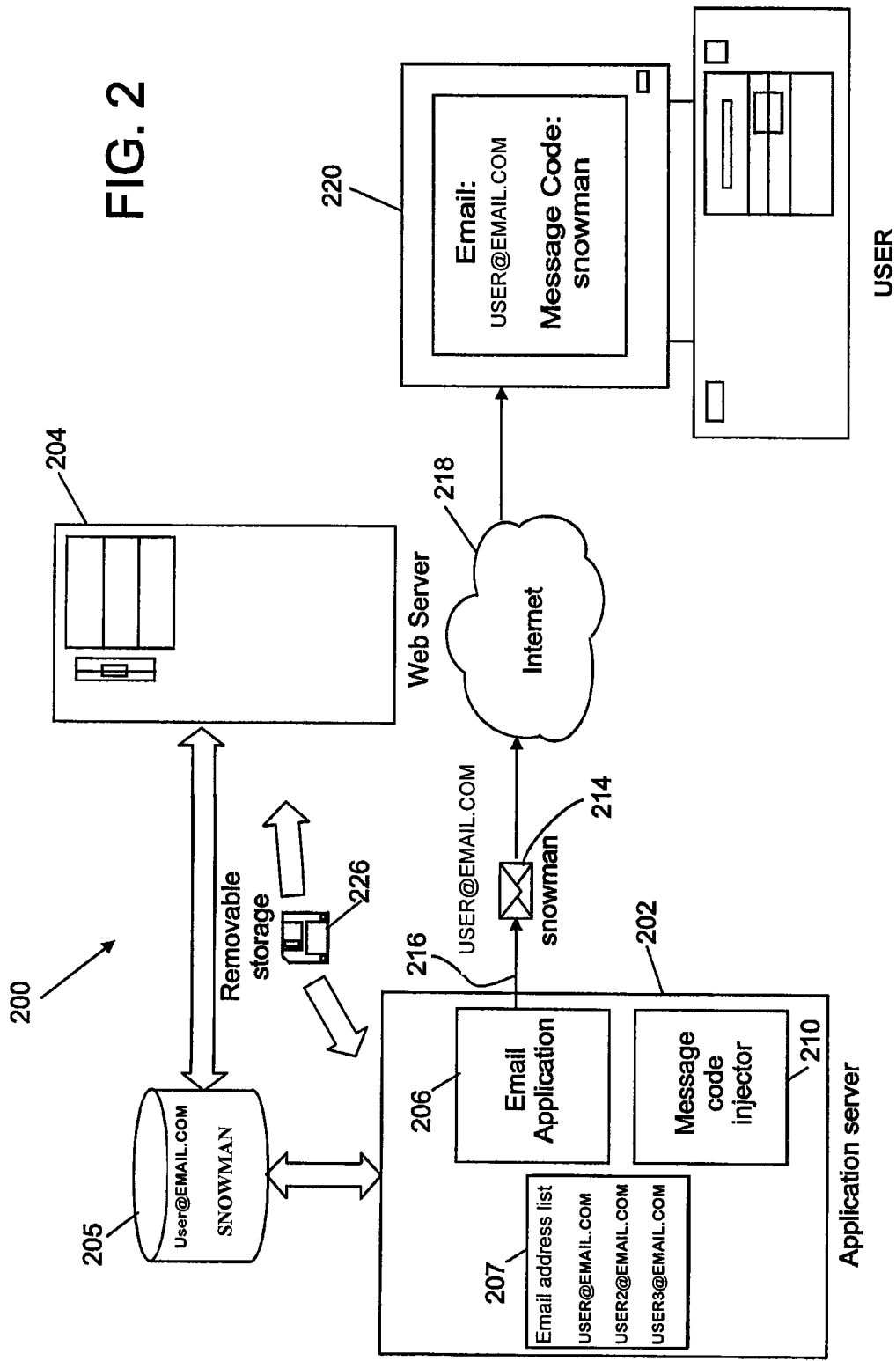
FIG. 2 is a block diagram which illustrates the system and operating environment according to another embodiment of the invention.

FIG. 2 is a network block diagram showing a system, 200, in which a recipient-specific code is used to authenticate and/or verify e-mail messages. As previously discussed, system 200 includes application server 202 and Web server 204. It should be noted that the system of FIG. 1 and the system of FIG. 2 are not mutually exclusive. That is, an e-mail sender can implement both types of message codes together in one system. Network block diagrams for embodiments using each of the two types of message codes are shown separately in this disclosure for clarity. Also, application server 202 and Web server 204 may in fact be the same server as can the servers illustrated in FIG. 1. In fact, both embodiments of the invention can be implemented at the same time on one server platform.

In the particular example embodiment illustrated in FIG. 2, it can be assumed that the recipient, again, User@EMAIL.COM, has established a relationship or opened an account with a business that is the sender of e-mail messages. For example, User may have been attracted to doing business with a company based on a marketing e-mail received via the example embodiment illustrated in FIG. 1. In the case of FIG. 2, User has previously logged into Web server 204 and established her personalized, recipient-specific message code, to be used to authenticate all e-mail messages from the sender to herself. The setting up of an account with a watermark, in this example, the word "snowman" is done through Web page screens in the same manner that other information would be entered and/or established as part of the account set-up process. Web server 204 then stores User's e-mail address and her recipient-specific code in database 205.

When an e-mail message is going to be sent, e-mail application 206 is invoked to compose and send the e-mail message. E-mail application 206 may access a list of e-mail addresses, e-mail address list 207. This list of e-mail addresses could be kept within database 205, but it may be necessary to maintain a separate list of e-mail addresses, since not all recipients on the list may have chosen to avail themselves of the security provided by the recipient-specific codes available with this embodiment of the invention. Manual entry of an e-mail address can also be supported. In this example, message code injector 210 retrieves User's message code or watermark from database 205. E-mail message 214 is sent by e-mail application 206 via interface 216 to User@EMAIL.COM. In this case, the e-mail message has her code or watermark, the word "snowman" embedded therein. E-mail message 214 traverses the Internet, 218, and is eventually displayed on User's terminal or personal computer, as shown at 220. In this case, User is able to verify the authenticity of her e-mail message by her knowledge that the recipient-specific message code, "snowman," is the unique watermark that she created or accepted. However, the e-mail message can optionally provide instructions to verify the message in the manner previously described. It may be advantageous for the sender to provide such capability, since some recipients may have forgotten their unique watermark, or even the fact that they set up a recipient-specific code for use in e-mail messages.

Figure 3:
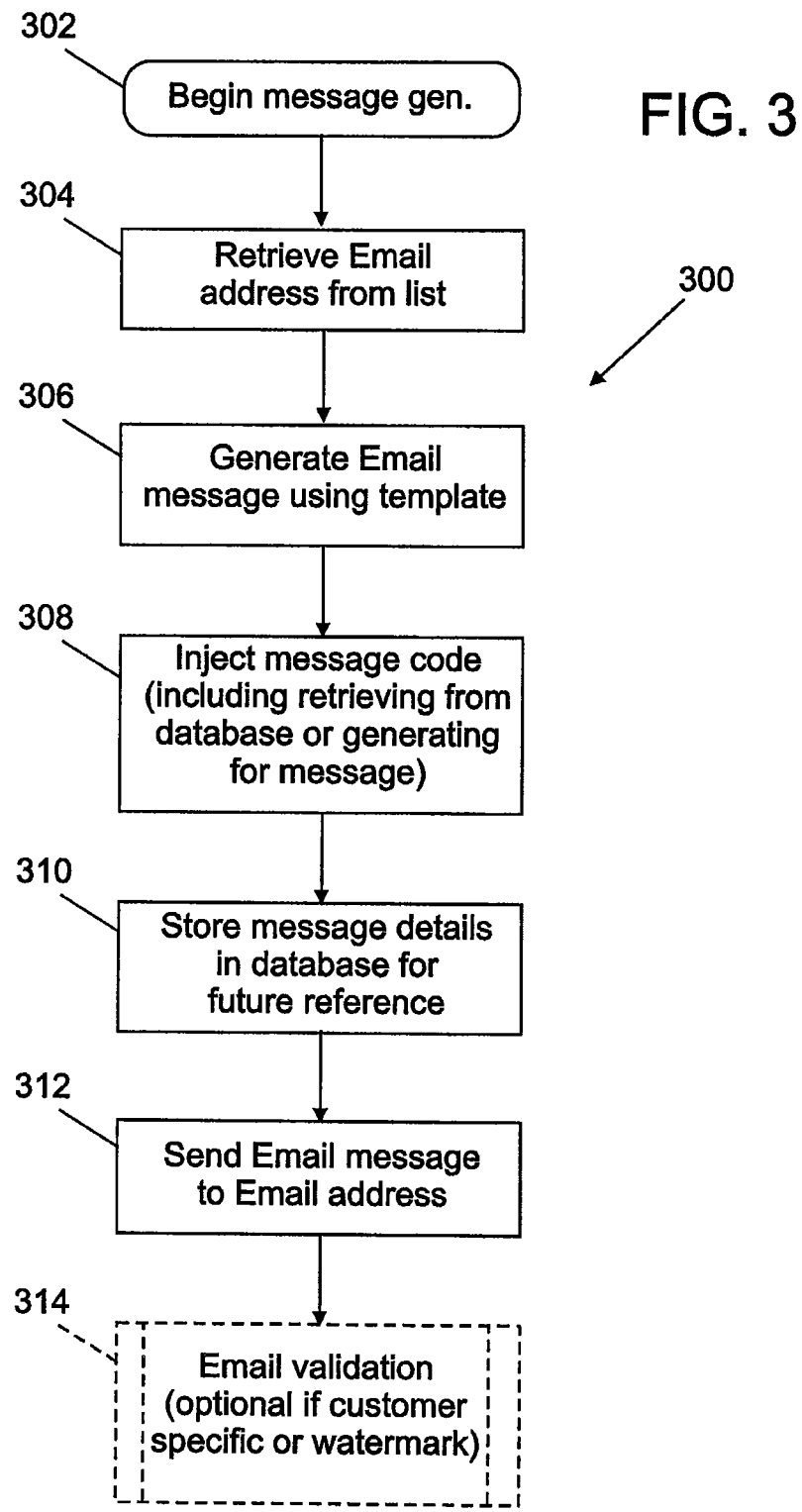
FIG. 3 is a flowchart illustrating a method according to some example embodiments of the invention.
Figure 4:
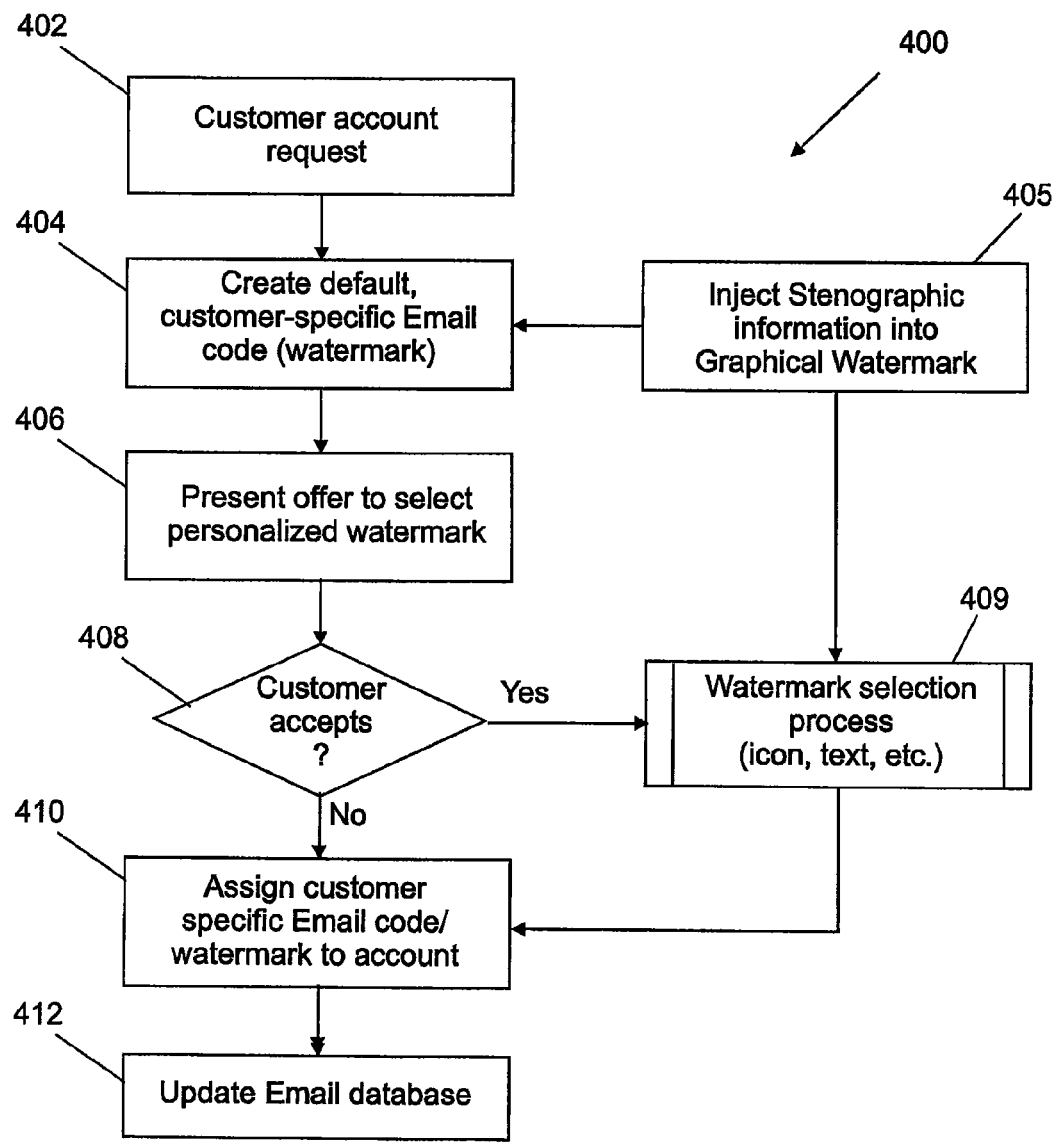
FIG. 4 is another flowchart illustrating another method according to some example embodiments of the invention.
Figure 5:
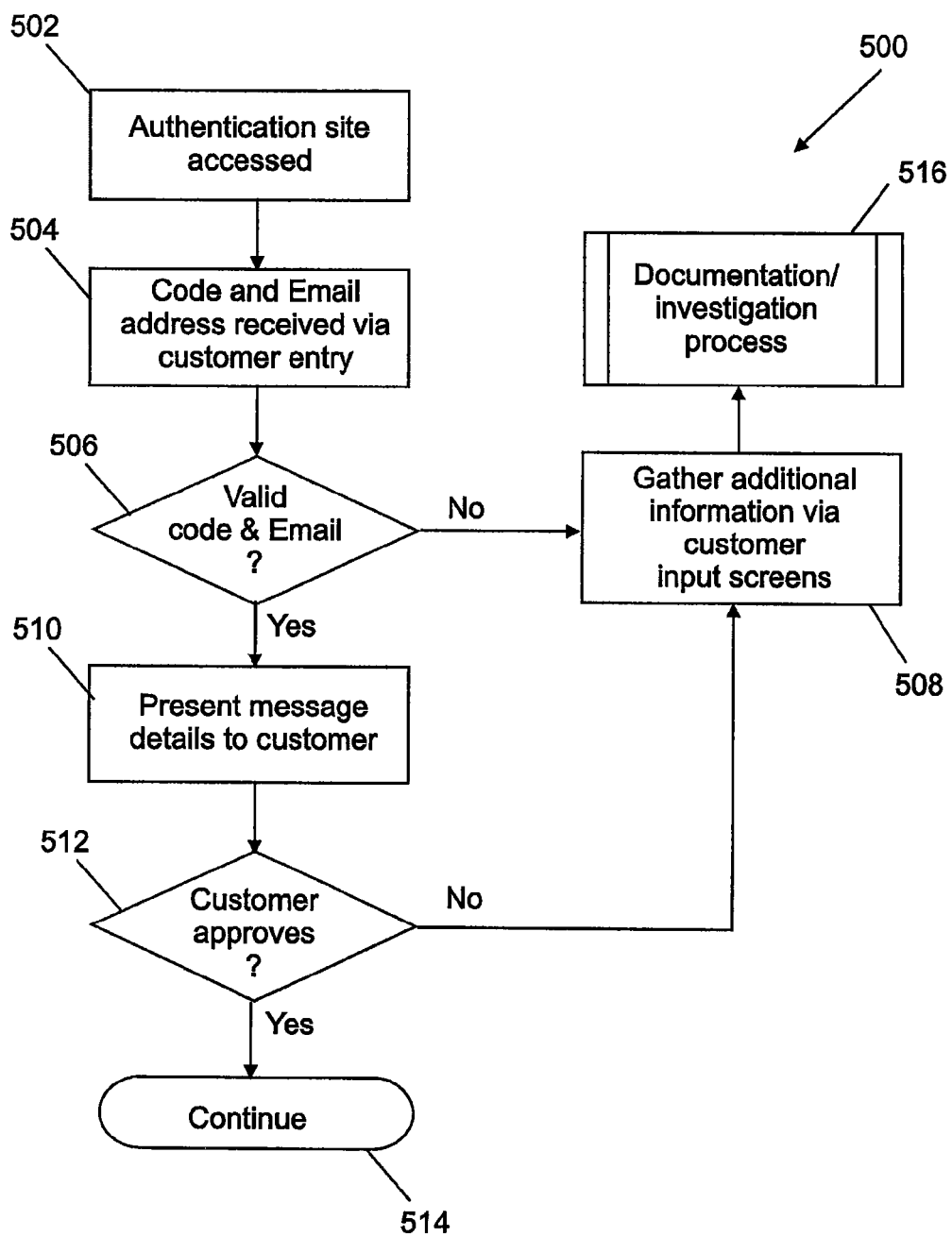
FIG. 5 is another flowchart illustrating another method according to some example embodiments of the invention.

FIGS. 3, 4 and 5 illustrate the operation of embodiments of the invention in flow chart form. FIG. 3 illustrates a process, 300, for generating an e-mail message in which the message code is disposed to serve as an authenticity indicator, according to example embodiments of the invention. As is typical with flowcharts, the various sub-processes or lower level processes of the illustrated process are shown as process blocks. The message generation process begins at block 302. At block 304, the appropriate e-mail address is retrieved from the appropriate e-mail address list. At block 306, an e-mail message is generated. In many cases, the e-mail message is generated using a pre-determined message template, maintained by an e-mail application. Such a template may be one that is generally used for certain kinds of marketing messages, or specific types of messages to current customers of a business. At block 308, the appropriate message code is injected. In the case of a message-specific code that is uniquely associated with the specific e-mail message, the message code may be generated by a message code generator running on the application server. Otherwise, for example, with a watermark, the message code may be pre-selected and retrieved from a database. At block 310, the e-mail address, message code, and possibly other message details are stored in a database for future reference. At block 312, the e-mail message is sent to the recipient at the recipient's e-mail address. The e-mail validation process, that is, the process whereby the recipient authenticates the e-mail, optionally takes place at block 314. As previously discussed, this process may not be necessary if a recipient-specific message code or watermark is used as opposed to a message-specific code.

FIG. 4 is a flowchart which illustrates the process of establishing the message code as a recipient-specific or user-specific code uniquely associated with the user in example embodiments of the invention. Process 400 of FIG. 4 is again illustrated as a series of process blocks. It can be assumed for purposes of the example of FIG. 4, that a customer of the sender is setting up a customer-specific e-mail message code or watermark pursuant to establishing an account with the sender. At block 402, a request to establish an account is received, for example, through a Web server. In this example, the sender's system creates a default, customer-specific e-mail code at block 404. Those of ordinary skill in the art will recognize that this step is optional. Also optional is the inclusion of stenographic graphical information in the watermark at block 405. At block 406, the customer is presented with an offer to select a personalized watermark or message code. At block 408, a determination is made as to whether the customer accepts this offer, by indicating their desire to generate, select, or input a personalized code via a typical Web interface. If the customer accepts the offer, a selection process takes place at block 409. As with the default watermark, optional stenographic information is placed into the watermark at block 405. During this process, the sender's system accepts a selection of the message code by the recipient customer. The message code is then stored in a database.

It should be noted that while such a message code will often be an alphanumeric string, that is a string of numbers, letters, keyboard characters, or a combination of the foregoing, other items could be used for the message code. For example, an image could be used, by way of an icon or digital photograph. Some combination of an alphanumeric string and an image could also be used. If an image is used, the customer could select the image from a library of standard images, or could supply their own image. Even if another customer uses the same image, if the library is sufficiently large, each image can still be considered to be uniquely associated with a recipient, as it will be unique enough to maintain an appropriate level of security. Other multimedia type files can be used as message codes, for example, video and/or audio files.

In the example of FIG. 4, regardless of whether the customer selects their own watermark at 409 or a default e-mail message code is used as assigned at block 404, the appropriate e-mail message code or watermark is associated with the customer or recipient's account at block 410. The appropriate update is then made to the appropriate database at block 412. In example embodiments, this database is illustrated in FIG. 2 as database 205. Note that the default message code can be a randomly assigned alphanumeric string, generated in a fashion similar to the way message-specific codes are generated in the example embodiments disclosed herein. Again, if appropriate algorithms are implemented, such a code can be considered to be uniquely associated with a recipient or user, even if it is theoretically possible that two recipients could have the same code. If such an occurrence were to take place, the recipient-specific code would still be unique enough to provide an appropriate level of security.

FIG. 5 illustrates one example process, 500, of authenticating an e-mail message with a message-specific code embedded therein. It can be assumed that a similar process could be used for a recipient-specific code if desired. It cannot be over-emphasized that the process of FIG. 5, as well as other processes described herein are examples only, and could be implemented in many different ways. Process 500 of FIG. 5 begins at block 502 wherein an authentication Web site is accessed by a message recipient. In some embodiments, the message recipient can be directed to this site by the e-mail message itself, although it is advantageous to direct the customer to the site in some fashion that does not use an actual Web link. Embedding a Web link in an e-mail message can itself create a security exposure.

At block 504, the recipient enters, via Web site input, both the message code, and their e-mail address. At block 506, the database is checked to determine if the message code and address are valid. If not, the recipient is presented at block 508 with a screen on which additional information can be gathered. Otherwise, in this example embodiment, additional message details are presented at block 510 to the recipient. A check is made at block 512 as to whether the customer approves the details presented. This check can be accomplished either intrinsically, or expressly. For example, if the customer clicks on a link to continue with a specific transaction, it can be assumed that the customer approves of the message details. In many embodiments, a separate link will be provided on which the customer can click to indicate that the details of the message do not match, or that the customer does not approve the details of the message. In such a case, processing branches back to block 508, where additional information can be gathered. Otherwise, the recipient continues with any transactions prompted in the e-mail message at block 514.

Note that in the case of what is apparently an invalid or unauthentic e-mail, as evidenced by processing at block 508 being carried out, a documentation and investigation process can be initiated as shown at block 516. This process can include the forwarding of the information to appropriate authorities either within or outside of the e-mail sender institution or business enterprise, or other investigative actions.

The present invention, as described in example embodiments, can be implemented via systems like those illustrated in FIGS. 1 and 2, running computer program code instructions. The computer program code instructions can take the form of a computer program product residing on a computer usable or computer readable storage medium. One example of such a medium is a removable storage cartridge as illustrated at 126 of FIG. 1 and 226 of FIG. 2. Such a removable storage medium might store computer program code instructions optically, such as in the case of a DVD-ROM or CD-ROM, or magnetically, such as in the case of a high capacity diskette such as a so-called "zip" disk. A computer program product containing the program instructions can be supplied in such a form, and loaded on the servers or other systems involved, either directly, or over a network. Such computer program instructions, also commonly referred to as "software" direct the operation of computing platforms or instruction execution platforms to carry out processes of embodiments of the invention. The "medium" can also be simply a stream of information being retrieved when the computer program product is "downloaded" through the Internet or an intranet. Computer programs can reside on any medium that can contain, store, communicate, propagate, or transport the computer software or program for use by or in connection with an instruction execution system, apparatus, system, or device. The computer usable or computer readable medium may be, for example, an electronic, magnetic, optical, electromagnetic, infrared or semiconductor system, or a propagation medium. Note that the computer usable or computer readable medium can even be paper or another suitable medium on which the program code instructions are printed. In such a case, the program can be electronically captured via optical scanning of the paper or other medium, then processed in a suitable fashion.

FIGS. 6-9 illustrate screen shots that might be encountered by a recipient of e-mail messages wherein a sender is employing an embodiment of the invention. The screen shots depict the e-mail receipt and authentication process according to an embodiment making use of message-specific codes. However, some of the same principles can readily be applied to many other embodiments. For purposes of this example, assume the sender is a financial institution called "XYZ Bank" and is sending a consumer targeted marketing e-mail message. It should be noted that with respect to the e-mail address lists shown in FIGS. 1 and 2, one of the perspective e-mail recipients is "USER@EMAIL2.COM." This highlights another aspect of the invention, the fact that it can be used to manage both external e-mail communications over the Internet, and internal e-mail communications to recipients within the sender business or enterprise.

Figure 6:
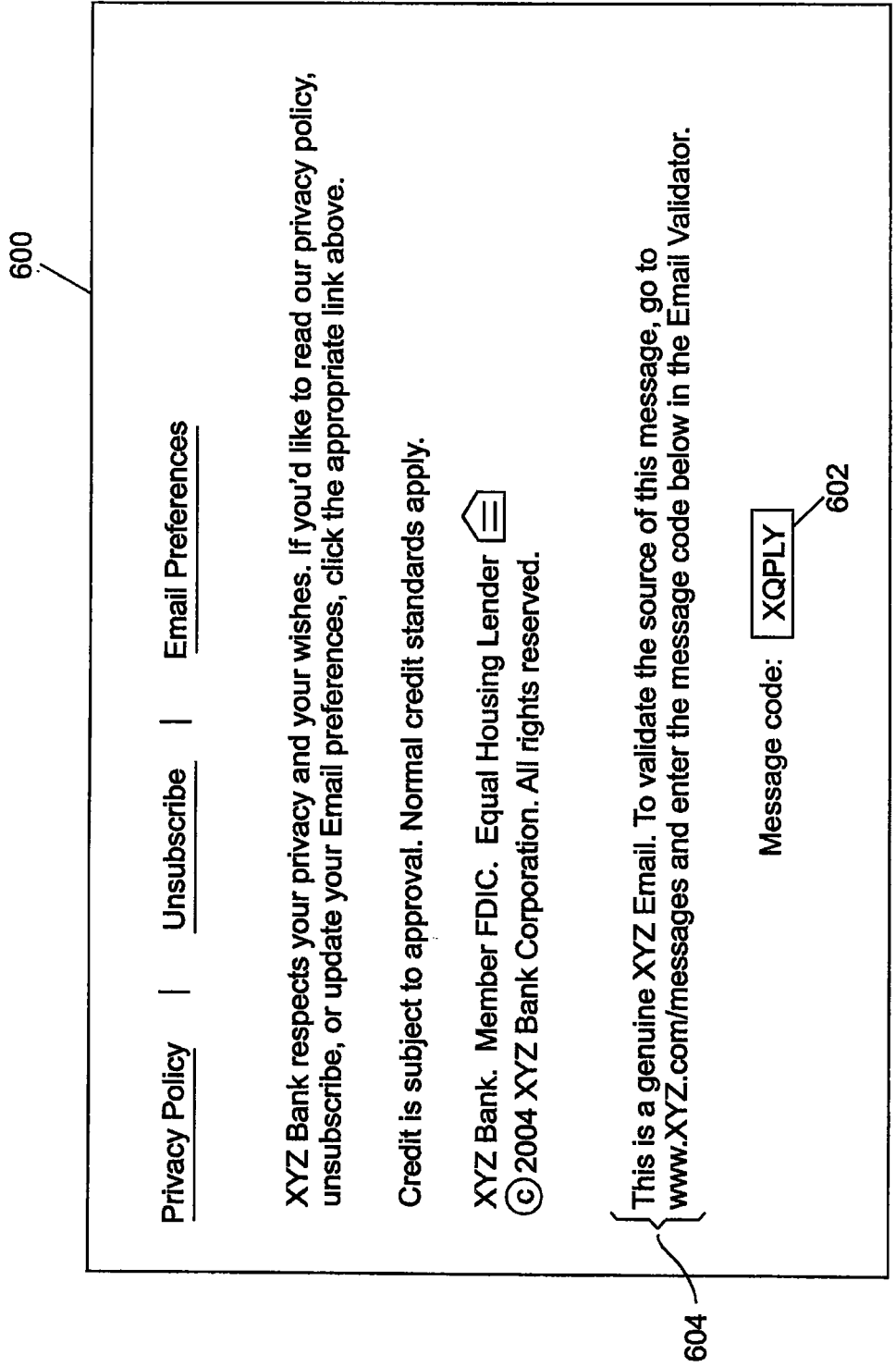
FIG. 6 is a screen shot illustrating how an embedded message code might appear according to some embodiments of the invention.

FIG. 6 displays a portion of an e-mail screen that might be displayed to a recipient of an e-mail message with a message-specific code embedded therein. Specifically, panel 600 includes a typical privacy statement and links to a privacy policy, an unsubscribe routine, and e-mail preferences. Other standard legal disclaimers and a copyright notice are also included. However, in addition to these standard elements, a message code is displayed. At the bottom of the panel, message code 602 consists of the alphanumeric string "XQPLY." Note that panel 600, which can be displayed as a footer in the e-mail message, also includes authenticity message 604, which directs the recipient consumer to a Web site that can be used to authenticate the e-mail. In this particular example, the name of the Web site tool as established by XYZ Bank is the "E-mail Validator."

Authenticity message 604 directs the consumer to a Web site, "www.XYZ.com/messages." Note that because embedded links are a spoofing vulnerability, the uniform resource locator (URL) referenced in the authenticity message is not an embedded link. Thus, the recipient must put this URL into the address field on his or her Web browser, either by typing or copying and pasting.

Figure 7:
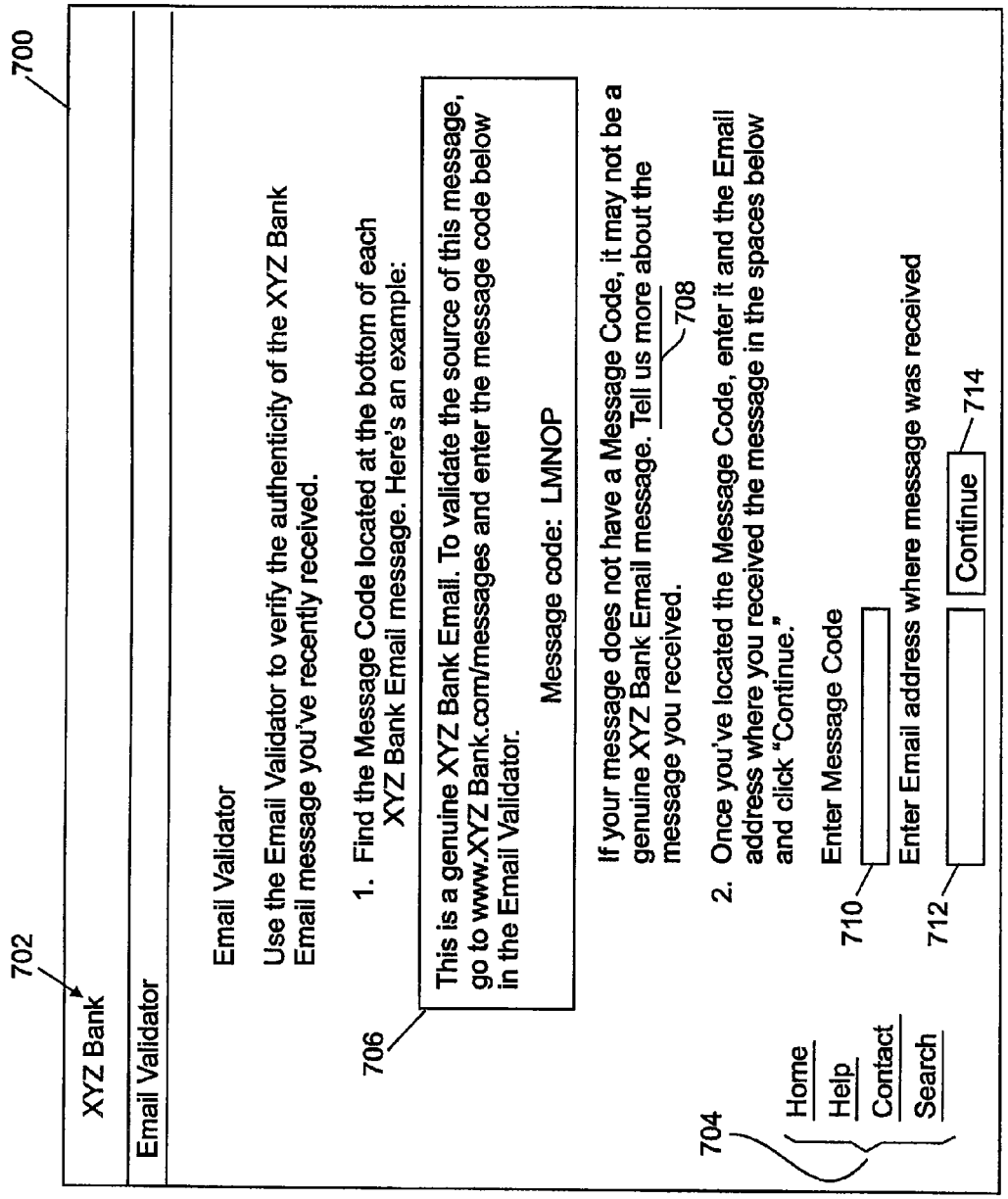
FIG. 7 is a screen shot illustrating how an authentication or validation form might appear to a recipient according to some embodiments of the invention.

FIG. 7 illustrates an example web page screen that might be encountered when a recipient of an e-mail message enters the URL for the E-mail Validator in their Web browser. Web page screen 700 includes logo or trademark 702, for sender XYZ Bank, navigational links 704, and detailed instructions. In particular, notice that the instructions include an example of how to find the message code in an e-mail message, including an image, 706, of an example message code e-mail panel. Link 708 allows the user to proceed to supply additional information via input screens if it is immediately suspected that the e-mail is not genuine. Field 710 provides a place for the recipient to enter his or her e-mail address. Field 712 provides a place for the recipient to enter the message code. Once a recipient has entered these items, the continue button, 714, is clicked in order to proceed to the next screen.

Figure 8:
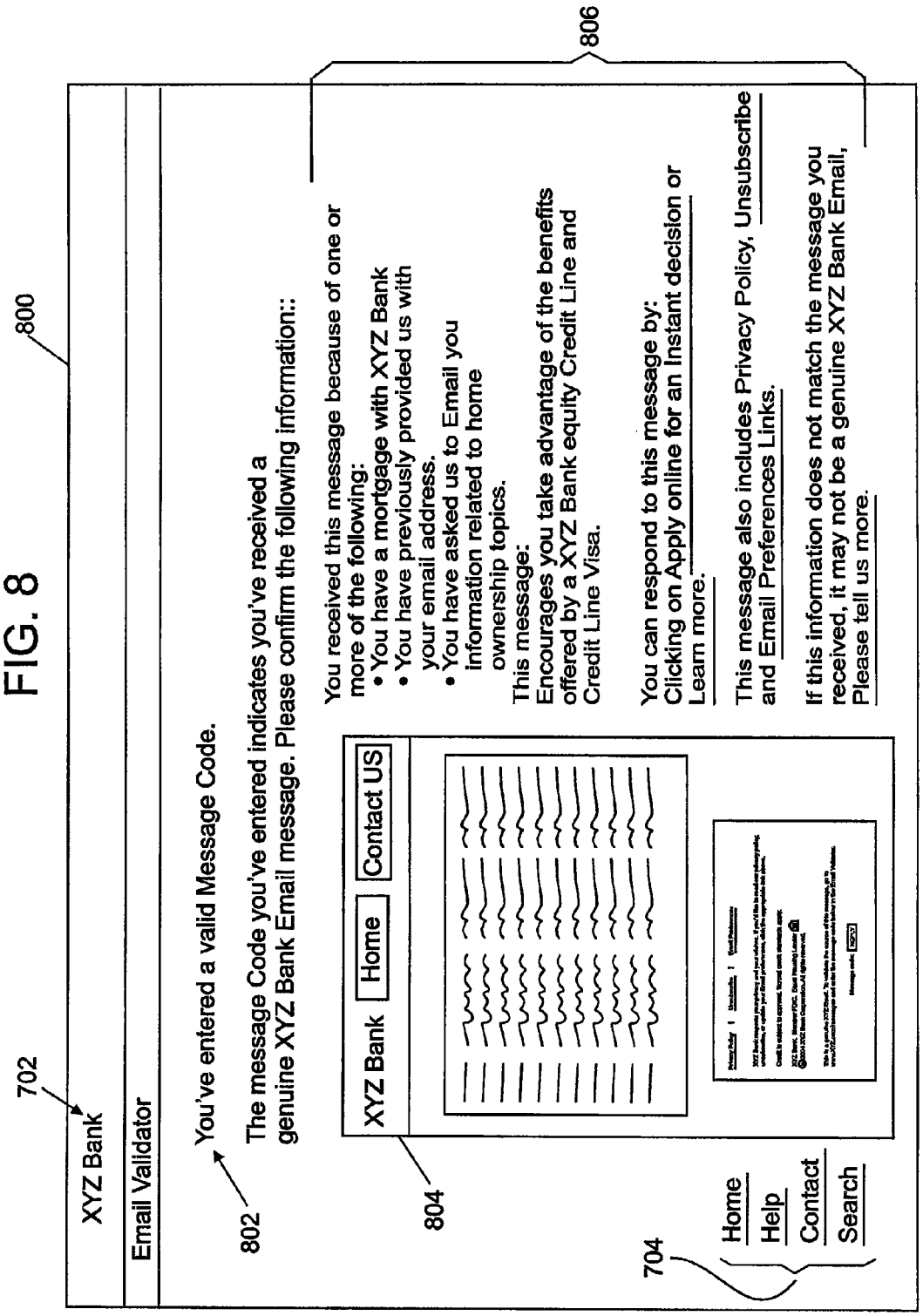
FIG. 8 is a screen shot illustrating a validation screen according to some embodiments of the invention.

FIG. 8 illustrates another Web page screen, 800, in this case, a screen that notifies the recipient that the message code and e-mail address entered on the previous screen is valid. Web page screen 800 includes logo 702 and navigational links 704 as before. This screen notifies the recipient that the message code is valid, as shown at 802. In this particular example embodiment, the screen also displays a copy, 804, of the e-mail message as it was sent. Finally, message details and additional instructions are provided in text area 806. For example, a consumer can click on a link to apply for a loan, which is presumably the action that the e-mail was designed to prompt. Additionally, a link is again provided to notify authorities at XYZ Bank if the message details cannot be verified or do not match.

FIG. 9 illustrates the top portion of a Web page screen 900, that a recipient can use to supply additional information to document and provide for the investigation of an apparently illegitimate e-mail. Again, logo 702 and navigational links 704 are provided in exactly the same fashion as the other screens. In addition, a plurality of fields, 902, are displayed and allow the recipient to enter detailed information which can then be forwarded on to appropriate personnel at the sender institution, in this example, XYZ Bank. It cannot be over-emphasized that the detail shown in the preceding screen shots is only an example implementation which is displayed in order to give the reader a feel for how an embodiment of the invention might be implemented.

Figure 10:
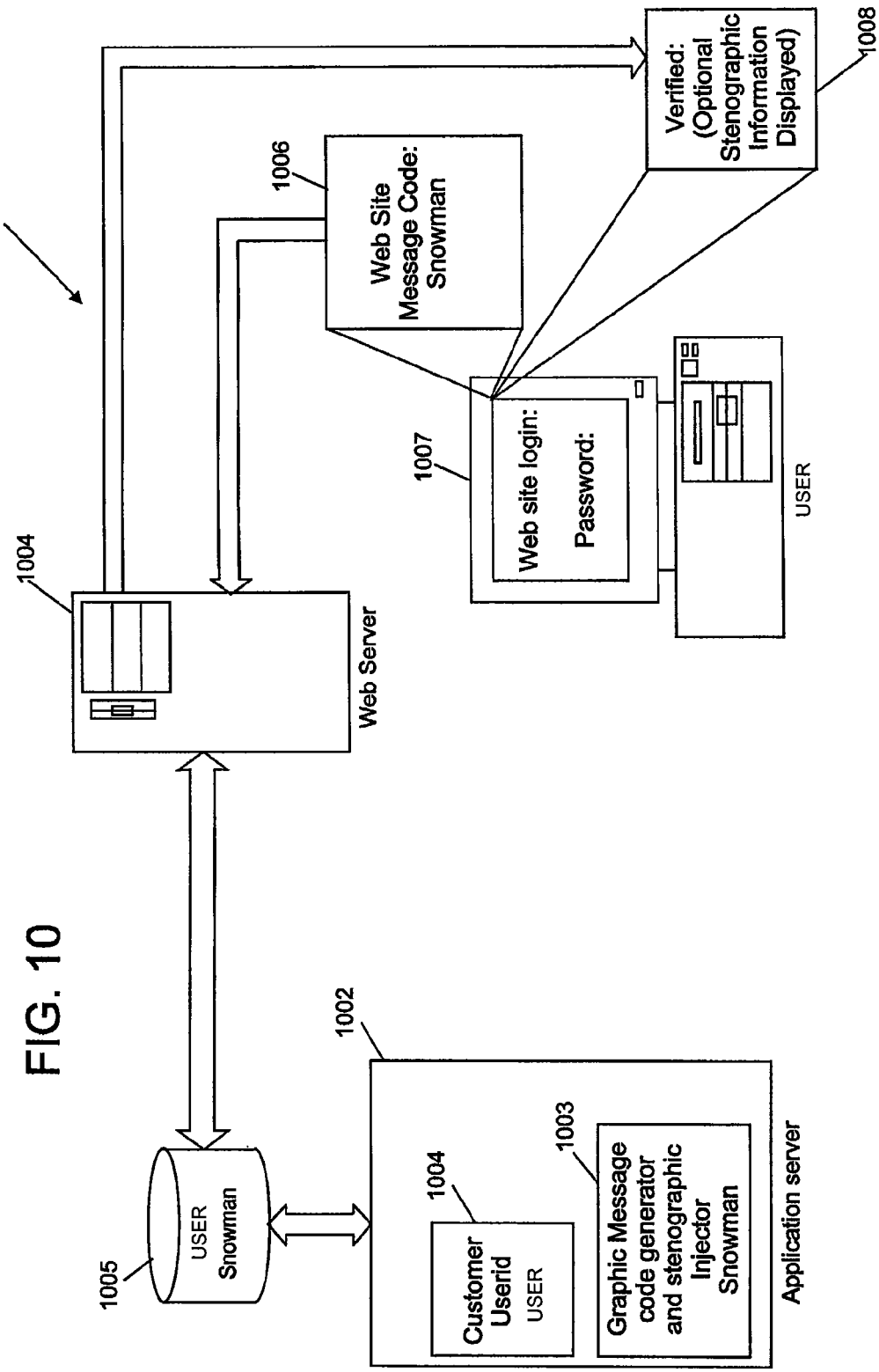
FIG. 10 is another block diagram which illustrates the system and operating environment according to another embodiment of the invention.

FIG. 10 is a network block diagram illustrating the operation of the invention in an example embodiment wherein a user-specific code, which is uniquely associated with a userid, is used to provide for verification of the legitimacy of a Web site. System 1000 of FIG. 10 includes application server 1002 and web server 1004. When a sender desires to logon to a Web site, such as via an on-line banking screen, 1006, a logon request to the web server 1004 is invoked. In this example, a copy of the userid list is maintained within the application server 1002. An userid list can also be maintained in a separate database system, or another application. It would also be possible to maintain the userid list in a database system which also contains the message code database.

Returning to FIG. 10, graphic message code generator and stenographic injector 1008 generates a graphical message code for each sender. The message code (watermark) also includes stenographic information that demonstrates that the code was generated by the Web site's corporate organization, such as a logo or cryptographic digital signature. In the example of FIG. 10, the User is attempting to logon to the web server 1004. The graphical watermark has been generated by process 1003, accessed by process 1004 and stored in database 1005. The web server 1004 retrieves the watermark from database 1005 and displays the watermark to the user in screen 1006. User visually inspects the graphical watermark "snowman" to determine if this is the watermark she selected (see FIG. 4). User may use encryption or other software on the PC 1007 to determine if the stenographic information for the message is correct.

It should be noted that a message-specific code can also be injected with stenographic information and used for Web site authentication. In such a case, for example, a graphical message-specific, even a one-time use code can first be provided in an Email and then used to access a Web site. In the case of a watermark or recipient-specific code, the Web site access could be spontaneous, as the user would typically be a regular customer who is aware of their watermark.

Figure 11:
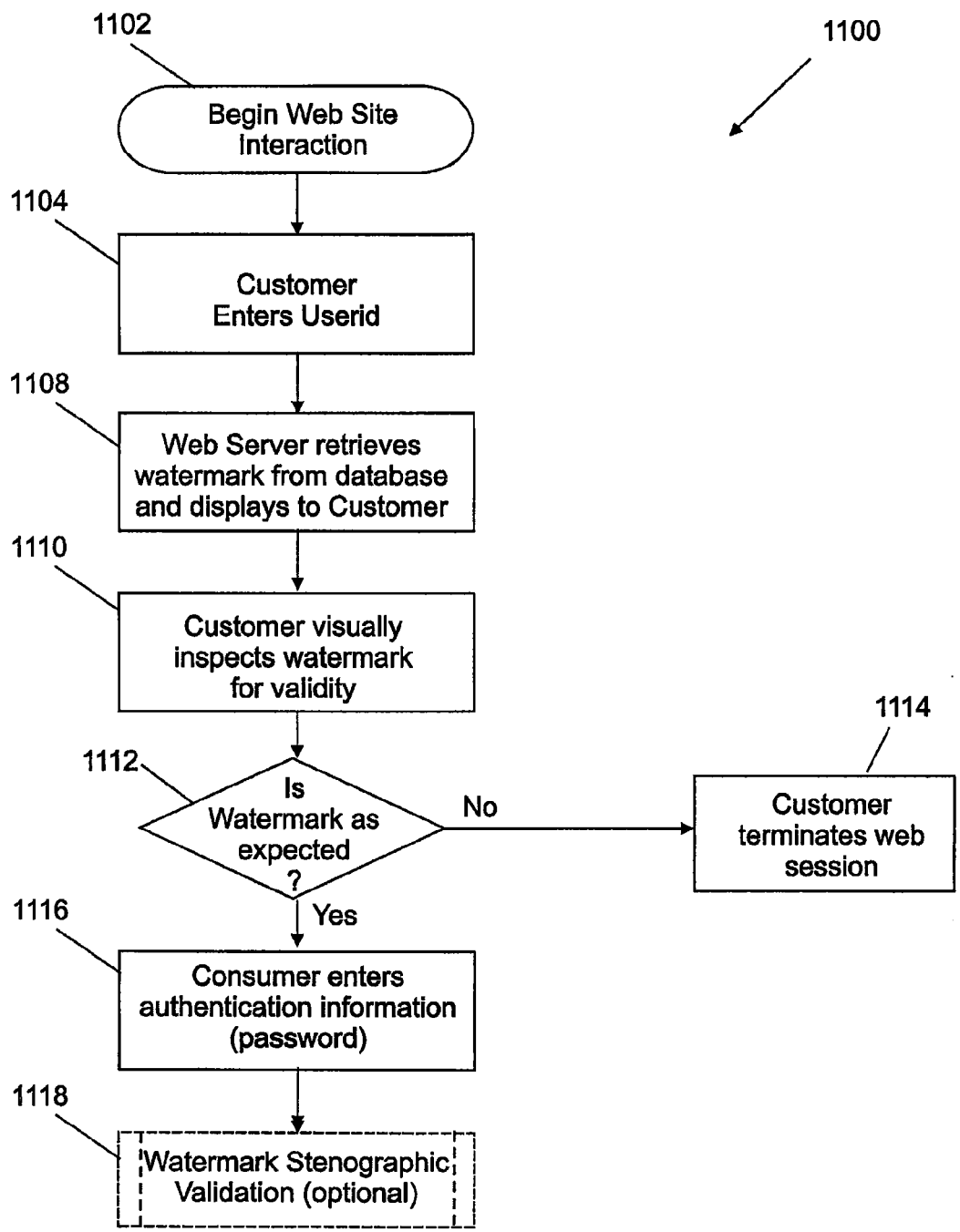
FIG. 11 is another flowchart illustrating another method according to some example embodiments of the invention.

FIG. 11 illustrates a process, 1100, that may take place in a system like that of FIG. 10. The user accesses the sender Web site in process 1102 wishing to be authentication in the interactive session to the web server. The web site sends an interaction back to the user asking for the identity (userid) of the user in process 1104. In process 1108, the web server retrieves the watermark from the database 1005 and displays the watermark to the customer. Process 1110 is performed by the customer visually inspecting the watermark and in process 1112 visually determining if the watermark is the one expected by the customer, i.e. associated by the customer with the userid. If the watermark is not the one that the customer thinks ought to be connected with the Web site access and the watermark display is invalid, the customer may terminate the session with the web site in process 1114. If the customer in process 1112 determines that the Web site has the authenticate watermark, the customer may enter their authentication information, such as a password in process 1116 and submit to the sender web server process 1005. The customer may chose to continue to the optional process 1118 to inspect the watermark invoking processes on the web server 1005. This results in the display of stenographic graphical information as shown at 1008 of FIG. 10.

Figure 12:
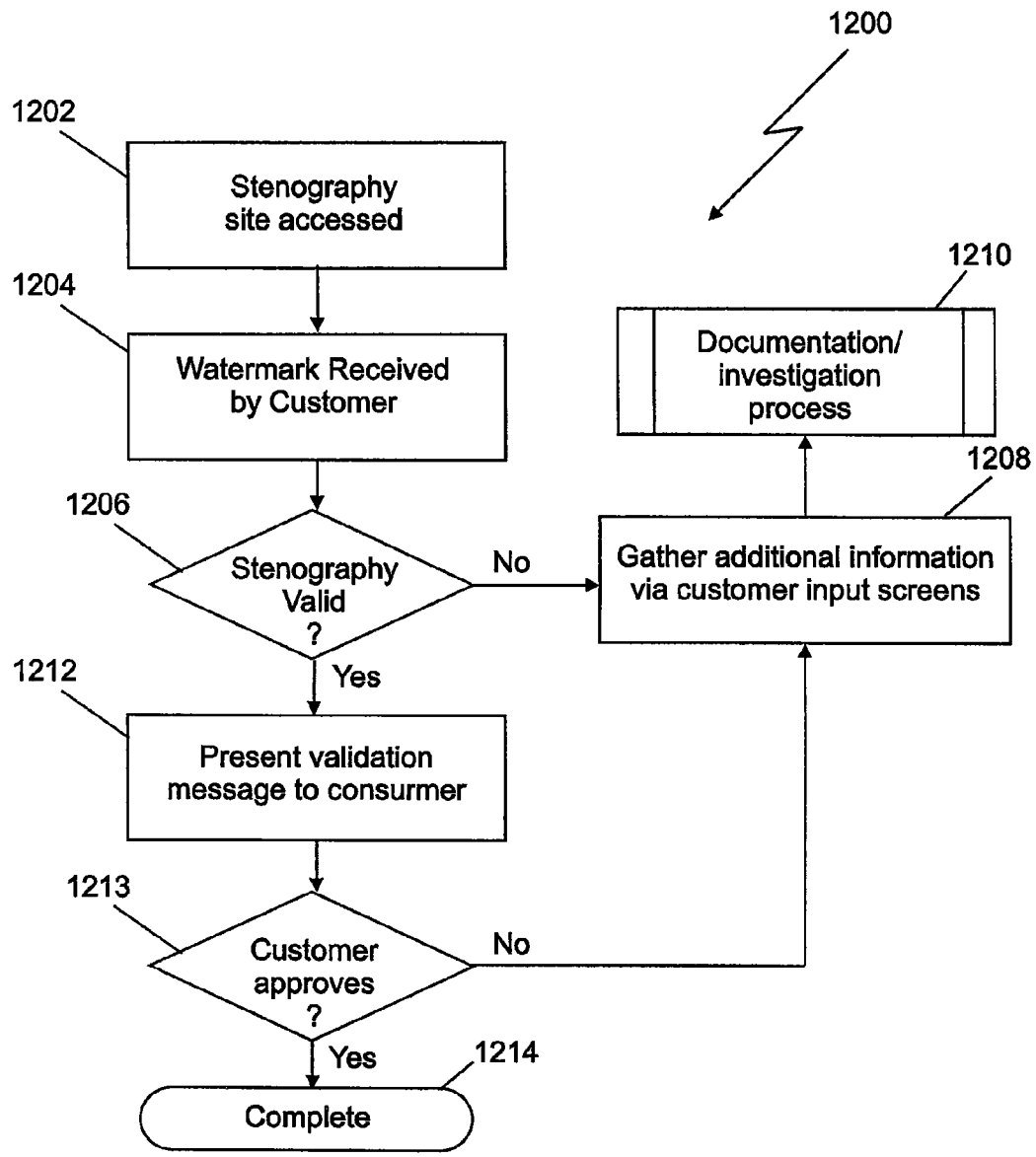
FIG. 12 is another flowchart illustrating another method according to some example embodiments of the invention.

FIG. 12 represents the process, 1200, of the customer checking the validity of the stenographic information within the graphical watermark as at 1008 of FIG. 10. The customer accesses a specific web site on the web server 1004. The Web site retrieves the current watermark for the customer and displays it with the stenographic information in process 1204. Optionally, the customer may paste and post to the web site the watermark that was presented by a potentially fraudulent site or e-mail in process 1204. In process 1206, the Web server 1008 determines if the stenographic content of the watermark is correct according to the mechanisms used to create the watermark in process 414 of FIG. 4. If process 1206 is positive (Yes), the customer is presented with validating information and messages by process 1212. For process 1213, if the customer approves of this information, meaning it seems correct to the customer, the customer continues with normal web interactions in process 1214. If the customer notices some inconsistency or irregularity, the flow continues with process 1208 where further information is gathered by the Web server interacting with the customer. This information is directed to further investigation in process 1210.

Specific embodiments of an invention are described herein. One or ordinary skill in the computing and networking arts will quickly recognize that the invention has other applications in other environments. In fact, many embodiments and implementations are possible. The following claims are in no way intended to limit the scope of the invention to specific embodiments described herein.

What is claimed is:

1. A method comprising:
   associating a message code with a user identifier;
   receiving the user identifier from a user, wherein the receiving occurs after the associating the message code with the user identifier;
   determining, using a hardware processor, that the user identifier is associated with the message code, wherein the determining occurs after the receiving the user identifier;
   presenting the message code to the user based at least partially on the determining that the user identifier is associated with the message code;
   receiving a user authentication from the user after presenting the message code to the user;
   determining that the received user authentication is associated with the user identifier and the message code; and
   providing the user with access to a secured resource based on the determining that the authentication is associated with the user identifier and the message code.

2. The method of claim 1, wherein the associating the message code with the user identifier comprises:
   presenting a user interface to the user that enables the user to select a message code for association with the user identifier;
   receiving information indicating that the user has selected the message code for association with the user identifier; and
   associating the message code with the user identifier based at least partially on the receiving the information indicating that the user has selected the message code.

3. The method of claim 2, wherein the user interface presents a plurality of message codes to the user for selection and receives a selection of a message code selected by the user.

4. The method of claim 2, wherein the user interface enables the user to input or upload a message code into the user interface.

5. The method of claim 2, wherein the user interface enables the user to create a message code using the user interface and receives the message code created by the user.

6. The method of claim 1, wherein the message code comprises steganographic information that enables the user to verify that the message code originated from a trusted source.

7. The method of claim 6, wherein the user identifier is associated with a financial account, wherein the financial account is maintained by a financial institution, and wherein the steganographic information comprises a logo or digital signature of the financial institution.

8. The method of claim 1, wherein the secured resource comprises information associated with one or more financial accounts held by the user.

9. The method of claim 1, wherein the message code is uniquely associated with the user identifier.

10. The method of claim 1, wherein the associating the message code with the user identifier comprises:
    assigning the message code to the user identifier without allowing the user to select the message code;
    notifying the user that the message code has been assigned to the user identifier, wherein the notifying occurs before the receiving the user identifier from the user; and
    associating the message code with the user identifier based at least partially on the assigning the message code to the user identifier.

11. The method of claim 1, wherein the user identifier is associated with a financial account, and
    wherein the associating the message code with the user identifier occurs approximately when the financial account is opened.

12. The method of claim 1, wherein the message code comprises at least one of an alphanumeric string, photograph, image, icon, or watermark.

13. The method of claim 1, wherein the message code is known to the user before receiving the user identifier from the user.

14. An apparatus comprising:
    a processing device configured to:
      associate a message code with a user identifier;
      receive the user identifier from a user, wherein the receiving occurs after the associating the message code with the user identifier;
      determine, using a hardware processor, that the user identifier is associated with the message code, wherein the determining occurs after the receiving the user identifier;
      present the message code to the user based at least partially on the determining that the user identifier is associated with the message code;
      receive a user authentication from the user after presenting the message code to the user;
      determine that the authentication is associated with the user identifier and the message code; and
      provide the user with access to a secured resource based on the determining that the authentication is associated with the user identifier and the message code.

15. The apparatus of claim 14, wherein the processing device configured to associate the message code with the user identifier is further configured to:
    present a user interface to the user that enables the user to select a message code for association with the user identifier;
    receive information indicating that the user has selected the message code for association with the user identifier; and associate the message code with the user identifier based at least partially on the receiving the information indicating that the user has selected the message code.

16. The apparatus of claim 15, wherein the user interface presents a plurality of message codes to the user for selection and receives a user selected message code from the user from among the plurality of message codes.

17. The apparatus of claim 15, wherein the user interface enables the user to input or upload a message code into the user interface.

18. The apparatus of claim 15, wherein the user interface enables the user to create a message code using the user interface.

19. The apparatus of claim 15, wherein the message code is uniquely associated with the user identifier.

20. The apparatus of claim 14, wherein the secured resource comprises information associated with one or more financial accounts held by the user.

21. The apparatus of claim 14, wherein the processing device configured to associate the message code with the user identifier is further configured to:
   assign the message code to the user identifier without allowing the user to select the message code;
   notify the user that the message code has been assigned to the user identifier, wherein the notifying occurs before the receiving the user identifier from the user; and
   associate the message code with the user identifier based at least partially on the assigning the message code to the user identifier.

22. The apparatus of claim 14, wherein the user identifier is associated with a financial account, and
   wherein the associating the message code with the user identifier occurs approximately when the financial account is opened.

23. The apparatus of claim 14, wherein the message code comprises at least one of an alphanumeric string, photograph, image, icon, or watermark.

24. The apparatus of claim 14, wherein the message code comprises steganographic information that enables the user to verify that the message code originated from a trusted source.

25. The apparatus of claim 14, wherein the user identifier is associated with a financial account, wherein the financial account is maintained by a financial institution, and wherein the steganographic information comprises a logo or digital signature of the financial institution.

26. The apparatus of claim 14, wherein the message code is known to the user before the receiving the user identifier from the user.

27. A method comprising:
   receiving information indicating that a user has selected a message code;
   receiving information indicating that the user wishes to access a secure resource;
   presenting the message code to the user;
   receiving information indicating that the user has verified that the message code presented to the user matches the message code selected by the user;
   providing the user with access to the secure resource based at least partially on the receiving the information indicating that the user has verified that the message code presented to the user matches the message code selected by the user;
   receiving a user authentication from the user after presenting the message code to the user;
   determining that the received user authentication is associated with the user identifier and the message code; and
   providing the user with access to a secured resource based on the determining that the authentication is associated with the user identifier and the message code.

28. The method of claim 27, wherein the receiving the information indicating that the user wishes to access a secure resource comprises receiving a username for the user.

29. The method of claim 27, wherein the receiving the information indicating that the user has verified that the message code presented to the user matches the message code selected by the user comprises receiving a password for the user.

30. The method of claim 27, wherein the providing the user with access to the secure resource comprises presenting the user with access to an online, mobile, or text banking service.

31. The method of claim 27, wherein the message code is user selected before the receiving the information indicating that the user wishes to access a secure resource.

32. The method of claim 27, wherein the presenting the message code to the user serves to authenticate the secure resource to the user.

* * * * *